Sept. 15, 1970    L. C. PORTER ET AL    3,529,232
METHOD AND APPARATUS FOR FREQUENCY-TO-FREQUENCY CONVERSION
Filed May 31, 1968    2 Sheets-Sheet 1

LAWRENCE C. PORTER &
KENNETH E. GRAVES
    INVENTORS

BY Arnold, Roylance,
   Kruger & Durkee
        ATTORNEYS

LAWRENCE C. PORTER &
KENNETH E. GRAVES
INVENTORS

BY Arnold, Roylance,
Kruger & Durkee
ATTORNEYS

United States Patent Office 3,529,232
Patented Sept. 15, 1970

3,529,232
METHOD AND APPARATUS FOR FREQUENCY-TO-FREQUENCY CONVERSION
Lawrence C. Porter, Palos Verdes Peninsula, and Kenneth E. Graves, Saratoga, Calif., assignors to The Upjohn Company, Kalamazoo, Mich., a corporation of Delaware
Filed May 31, 1968, Ser. No. 733,377
Int. Cl. H02m 5/00
U.S. Cl. 321—60                             24 Claims

ABSTRACT OF THE DISCLOSURE

In a motor-driven pumping system, the transfer rate of the pump is not necessarily functionally related to the rotation of the pump shaft. Accordingly, means and method are provided for converting a fluctuating measurement signal having a frequency representative of motor or pump shaft rotation, into an indicator signal having a frequency functionally related to the transfer rate of the pump.

BACKGROUND OF INVENTION

This invention relates to methods and apparatus for converting one electrical frequency to another, and more particularly relates to methods and apparatus for deriving an electrical frequency functionally representative of the mass transfer rate of a material passing through a pump.

It is well known to transfer a flow of material from one location to another by means of a motor-driven pump, and it is well known to monitor and control the mass transfer rate of the material by measuring and controlling motor velocity as a function of pump transfer rate. For example, a frequency may be continually derived from the rotation of either the motor shaft or the pump shaft, and may be continually compared with a preselected frequency or other representative value to provide a continual measurement of the difference between the actual and a preselected material transfer rate.

Such a technique is acceptable in many instances wherein the mass transfer rate of a material need be controllable within only relatively broad limits. It will be apparent that the pump characteristics are almost never the same as the rotation rate of the motor shaft, and thus this technique is unsatisfactory for precision blending systems and the like, such as the system depicted in the co-pending patent application Ser. No. 701,596, filed Jan. 30, 1968, by Lawrence C. Porter and Kenneth E. Graves. Accordingly, these disadvantages of the prior art are overcome with the present invention, and methods and apparatus are provided herein for generating a frequency which is representative of the mass transfer rate of the pump rather than motor velocity.

SUMMARY OF THE INVENTION

In a preferred embodiment of the present invention, a first pulse train is continually generated which is representative in pulse frequency of motor velocity, and this first pulse train or signal is applied to a bootstrap generator or the like to produce a first ramp voltage having a magnitude representative of the frequency of this first signal. This first ramp voltage is applied to a capacitance during the time interval beginning with the start of each pulse in the first signal and ending with the start of the next succeeding pulse.

The arrival of each new pulse in the first signal will cause the first ramp voltage to instantly drop to zero or reference and to commence a new rise, but the accumulated charge is substantially maintained on the capacitor as a functional representation of the frequency of the pulses in the first signal.

A second bootstrap generator or the like is also included for the purpose of generating a second rising or ramp voltage which terminates each time it equals the charge accumulated on the capacitor. Thus, the frequency of the sawtooth output of the second generator will be a function of the voltage on the capacitor and, accordingly, a function of the frequency of the pulses in the first signal. However, the slope or rise rate of the output of the second generator will also be a factor determining the frequency of the sawtooth pulses from the second generator. Accordingly, the gain of the second generator is adjusted empirically to cause the frequency of these sawtooth pulses from the second generator to continually correspond functionally to the mass transfer rate of the material passing through the pump.

DRAWINGS

These and other features and objects of the present invention will be apparent from the following detailed description, wherein reference is made to the figures in the accompanying drawings.

DETAILED DESCRIPTION

Figure 1:
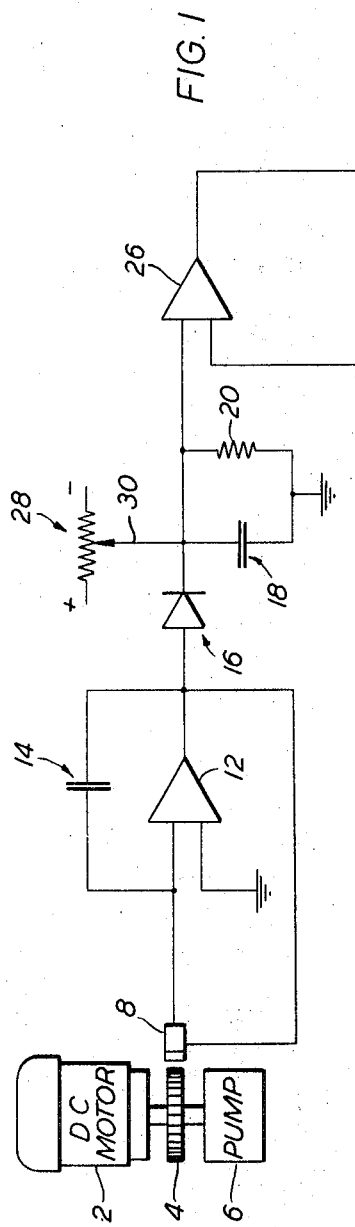
FIG. 1 is a functional representation of the basic portions of an exemplary system for monitoring the throughput rate of a typical motor-driven pump, or the like, including one embodiment of the present invention for deriving a pulse train having a frequency corresponding to such throughput rate.

Referring now to FIG. 1, there may be seen a functional representation of a typical pumping system, including a conventional pump 6 or the like which is driven by a DC motor 2 having a spur gear 4 concentrically mounted on its connecting drive shaft and having a predetermined number of teeth (for example, sixty). It is conventional to generate a pulse train having a pulse frequency corresponding functionally to the rotational velocity of the motor 2. As depicted in FIG. 1, this may be done by tipping each tooth of the gear 4 with a magnetic material, whereby a magnetic pick-up 8 will generate a pulse or wave each time a tooth on the gear 4 is rotated past the pick-up 8.

The pulses from the pick-up 8 are applied to one terminal of an operational amplifier 12 having a suitable capacitor 14 connected between this input and the output side of the amplifier 12. The other input terminal of the amplifier 12 seen to be grounded in a conventional manner, and each time a pulse or signal is generated by the pick-up 8, this pulse is then applied to the amplifier 12 to return its output end to reference or ground voltage.

More particularly, the capacitor 14 provides that the amplifier 12 shall generate a ramp voltage at a preselected rise rate dependent on the gain of the amplifier 12, and this ramp voltage may be passed through a diode 16 to charge a grounded capacitor 18. As connected, the amplifier 12 continually generates a ramp voltage. However, the magnetic pick-up 8 is also connected to short out the capacitor 14; each time the pick-up 8 generates or conducts a pulse into the input side of the amplifier 12, and this will return the output side of the amplifier 12 to reference or "zero," whereupon the amplifier 12 immediately begins generating another similar sawtooth voltage output having the same rise rate.

It will be apparent that the capacitor 18 will discharge only very slowly. The output rate of pulses from the pick-up 8 may rise quite rapidly, however, whereupon the sawtooth pulses from the amplifier 12 will be generated at a greater frequency but with a lower amplitude. As hereinafter explained, the purpose of the voltage on the capacitor 18 is to establish an analog representation of the frequency of the pulses from the pick-up 8, and thus it is desirable that provision be included to cause the voltage on the capacitor 18 to fall with the increase in frequency of the pulses from the pick-up 8. Accordingly, a preselected resistor 20 is connected across the grounded capacitor 18 to leak the charge off of the capacitor 18 at a desired rate, whereby the charge stored on the capacitor 18 will decline as fast as the ramp voltages increase in frequency and decline in peak amplitude.

The charged side of the grounded capacitor 18 (and thus the accumulated voltage representing the frequency of the pulses from the pick-up 8), may be seen to be connected to one of the inputs of a voltage comparator 26. The other input side of the comparator 26 is connected to the output of a second operational amplifier 22 which is similarly interconnected with a suitable capacitor 24 to function as another bootstrap or ramp generator. One input of the amplifier 22 is grounded in a conventional manner, and the other input is connected to one side of a switch 10. As may also be seen, the arm of switch 10 is arranged to be closed by the energization of a coil 27 connected between ground and output side of the comparator 26.

As hereinbefore stated, the second amplifier 22 continually generates a ramp voltage having a slope dependent on its gain, and this ramp voltage is applied to the comparator 26 along with the voltage from the first amplifier 12 which has been accumulated on the grounded capacitor 18. As long as the two voltages into the comparator 26 are unequal, the comparator 26 will not produce an output signal. When the voltage from the second amplifier 22 attains the level of the voltage remaining on the capacitor 18, however, the comparator 26 will generate a signal through the coil 27 momentarily to close the switch 10 and "discharge" the second amplifier 22 by shorting out the capacitor 24. The output from the second amplifier 22 into the voltage comparator 26 will then immediately fall to "zero," and the voltage comparator 26 will immediately discontinue its output signal through the coil 27. Accordingly, the switch 10 will reopen and the second amplifier 22 will commence generating a new ramp voltage.

It will be apparent that the frequency of the pulses from the second amplifier 22 will be related to the magnitude of the voltage on the capacitor 18. However, the frequency of the pulses from the second amplifier 22 will also be related to the slope of the ramp voltage from the second amplifier 22. Accordingly, the system depicted in FIG. 1 may be empirically adjusted to provide the desired output frequency at $e$, by adjusting the gains of the amplifiers 12 and 22.

It will be apparent to those of experience in this art that the pumping characteristics of pump 6 will be substantially non-linear in the lower range of its delivery rates. A projection of the linearity of these pumping characteristics through zero mass transfer rate may provide a false and misleading output frequency from the second amplifier 22 within this lower range of frequencies extending to zero. Accordingly, it is preferable to provide a "zero offset" to the output from the second amplifier 22, which may be done by suitable adjustment of a potentiometer 28 having its wiper 30 connected to the charged side of the capacitor 18. The ends of the resistance portion of the potentiometer 28 will be charged positive and negative respectively, and thus the wiper 30 will apply a zero voltage to the first input of the comparator 26 when the wiper 30 is positioned midway of the ends of the resistance. On the other hand, if the wiper 30 is shifted from midpoint, this will apply a continual potential on the upper side of the comparator 26 which may be either positive or negative, and which will be proportional to the amount of "zero offset" sought to be provided.

Figure 2:
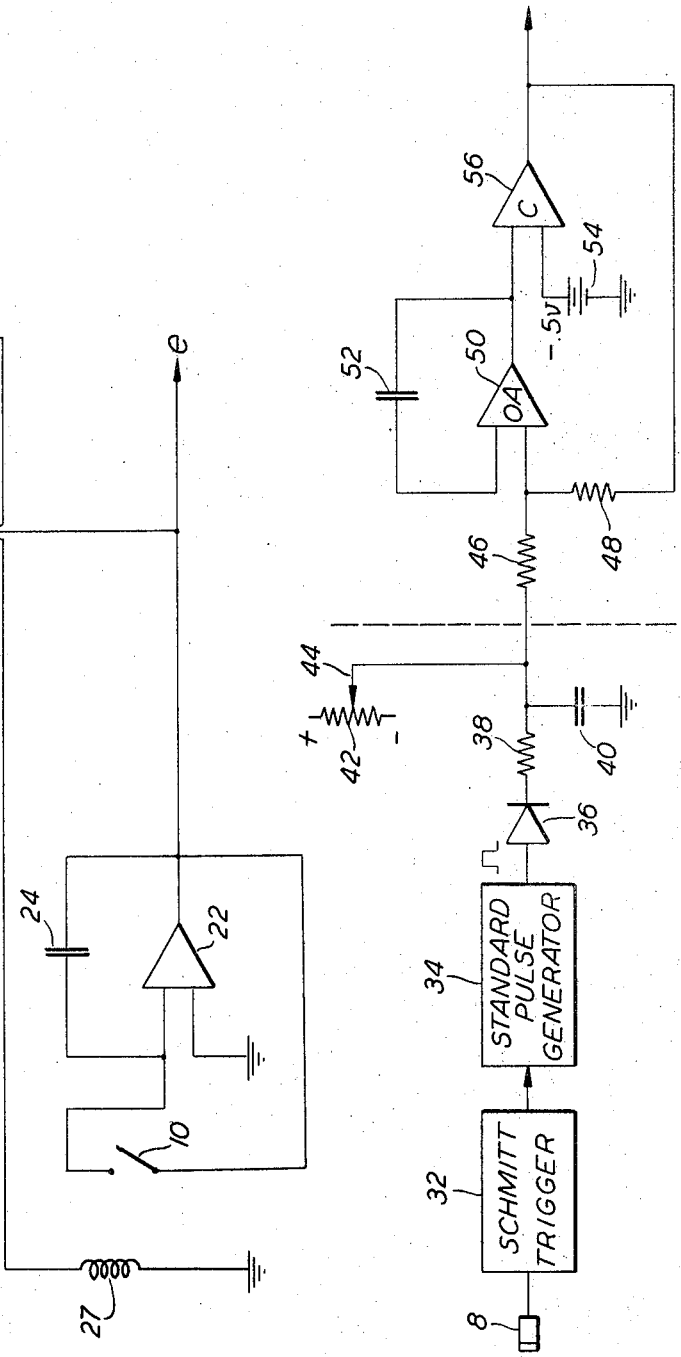
FIG. 2 is a functional representation of a portion of the system depicted in FIG. 1, and illustrating an alternative embodiment of the present invention.

Referring now to FIGURE 2, there may be seen an alternate form of the system depicted in FIG. 1, wherein the magnetic pick-up 8 (or other suitable pulse supply) is connected to the input of a Schmitt trigger circuit 32 which functions to produce corresponding but square pulses to the input of a suitable pulse generator 34 capable of generating corresponding pulses having a preselected standard height and width. These standard pulses are applied through a diode 36 to a standard integrator circuit composed of a resistor 38 and grounded capacitor 40, thereby accumulating a charge functionally related to the number and therefore to the frequency of these standard pulses.

This charge will also be applied through a resistor 46 to one input of an operational amplifier 50. As will be seen, a capacitor 52 is connected between the output side and the other input side of the amplifier 50, to provide a continually operating ramp generator developing a ramp voltage having a slope related to the gain of the amplifier 50.

The output of the amplifier 50 is also connected to one input of a voltage comparator 56 having a voltage source 54 producing a preselected reference voltage connected to its other input. Accordingly, it may be seen that there will normally be no output produced by the comparator 56. However, when the charge accumulated on the capacitor 40 reaches or attains the level of the fixed voltage output from source 54, the comparator 56 will fire to "ground" or discharge the amplifier 50.

A potentiometer 42 with centered wiper 44 may be connected to the charged side of the capacitor 40, to provide "zero offset" adjustment means as hereinbefore explained. No specific leakage provision need be made, however, since the capacitor 40 will tend to leak out to the output side of the voltage comparator 56, at a rate dependent on the value of the resister 48.

The circuits depicted in FIGS. 1 and 2 are basically analog in concept, although they are fully compatible with digital systems, inasmuch as they receive and produce digital-type signals. There are obvious advantages to a more digital-like frequency-to-frequency converter circuit for present and other purposes, however.

Figure 3:
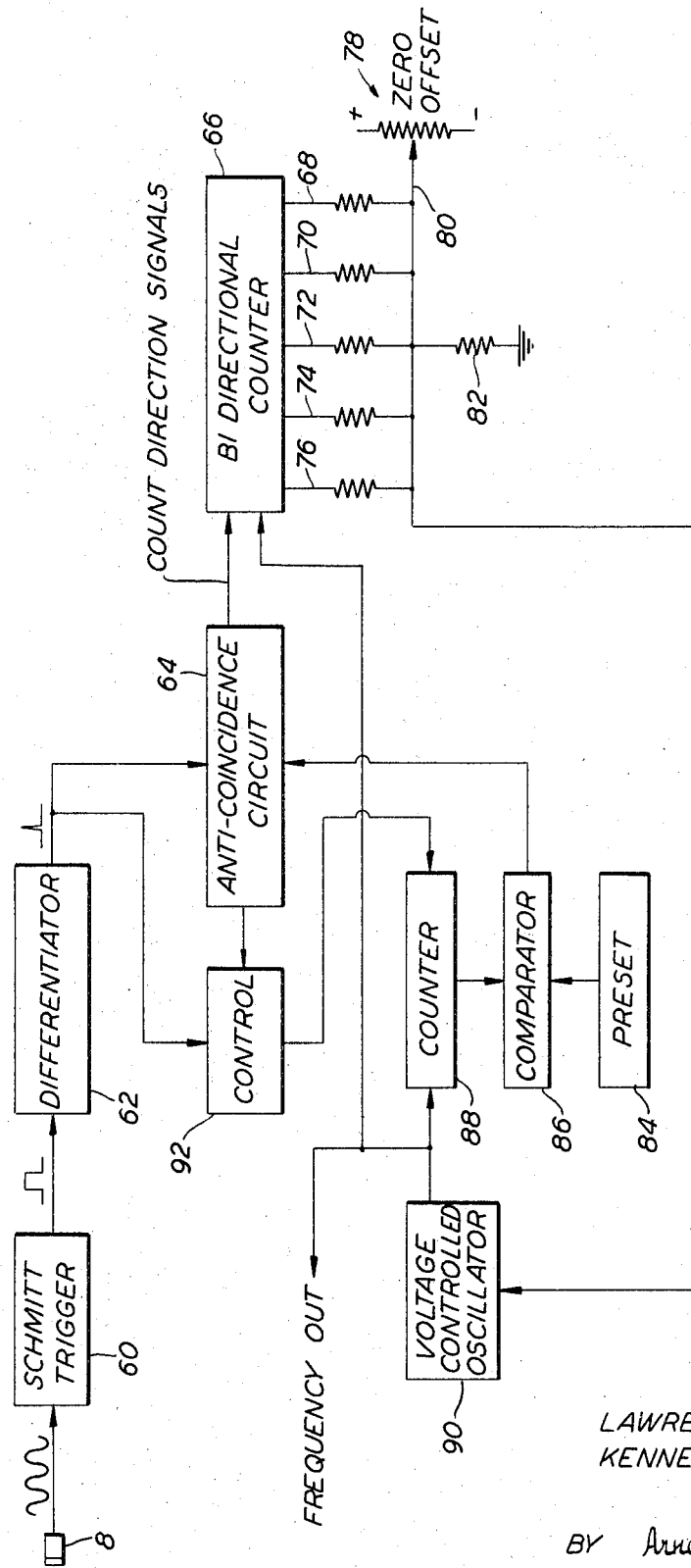
FIG. 3 is another functional representation of a portion of the system depicted in FIGS. 1 and 2, and illustrating a further alternative embodiment of the present invention.

Referring now to FIG. 3, there may be seen another embodiment of the present invention, wherein the magnetic pick-up 8 is again connected to the input of a conventional Schmitt trigger circuit 60, the output of which is connected to a differentiator 62. It is the function of the differentiator 62 to apply a sharp pulse to an anti-coincidence circuit 64 concurrent with a preselected portion (such as the leading edge) of each of the square pulses from the trigger circuit 60. As may be seen, a voltage controlled oscillator 90 is provided to generate a continuous train of pulses, and these pulses are applied simultaneously to a bi-directional counter 66 and to a counter circuit 88 having its output connected to one side of a digital comparator 86. A preset circuit 84, which may be adjusted to establish a conversion factor representing the ratio of the output frequency from the oscillator 90 to the ratio of the pulses from the pick-up 8, may be connected to the other side of the comparator 86.

As may be seen in FIG. 3, when the counts in the counter 88 reach the value established by the preset circuit 84, the comparator 86 will generate an output pulse to the other side of the anti-coincidence circuit 64. If the pulse from the comparator 86 reaches the anti-coincidence circuit 64 coincidently with the pulse from the differentiator 62, the anti-coincidence circuit 64 will not produce an output. However, if one of the pulses arrives ahead of the other, the anti-coincidence circuit 64 may generate a pulse to the bi-directional counter 66, the polarity of which pulse will depend on which of these pulses has arrived first. In addition, the anti-coincidence circuit 64 will generate a second pulse (of opposite polarity) when it receives the other of the two pulses from the comparator 86 and the differentiator 62, respectively.

The bi-directional counter 66 is adapted to commence counting pulses from the voltage controlled oscillator 90 upon receipt of the first input pulse from the anti-coincidence circuit 64, and to stop counting upon receipt of the second input pulse. The polarity of the first input pulse, however, will determine in which direction (plus or minus) the count is made.

Referring again to FIG. 3, there may be seen a resistive ladder network composed of resistors 68, 70, 72, 74 and 76, each connected at one end to ground or reference potential by means of resistor 82, and connected at their other ends to respective ones of the bistable multivibrators (not depicted) forming the various stages in the bi-directional counter 66. These resistors 68, 70, 72, 74 and 76, are also connected to the bias of the voltage controlled oscillator 90, whereby the count accumulated in the counter 66 will adjust and establish the frequency of the output pulses from the oscillator 90 to correspond to the actual mass transfer rate of the pump 6 (not shown).

A control circuit 92 may be provided to receive each pulse from the differentiator 62, and in response thereto to generate a pulse clearing the counter 88. In addition, the control circuit 92 may be responsive to a terminating pulse generated by the anti-coincidence circuit 64 simultaneously with the production of its second output pulse into the bi-directional counter 66, thus insuring that the counting period of the counter 66 is in fact the period between two successive pulses from the differentiator 62. As may also be seen in FIG. 3, a "zero offset" adjustment may be provided wherein a potentiometer 78 may be arranged as in FIGS. 1 and 2 with its wiper 80 connected to the bias of the oscillator 90.

As illustrated herein, emphasis has been given to the use of the present invention as methods and apparatus for deriving a frequency which is functionally indicative of the actual mass transfer rate of a motor-driven pump or the like. It will readily be apparent, however, that the present invention may be useful for any purpose wherein it is desired to generate one frequency from another different frequency.

Many modifications and variations besides these specifically mentioned may be made in the techniques and structures described herein and depicted in the accompanying drawings without departing substantially from the concept of the present invention. Accordingly, it should be clearly understood that the forms of the invention described and illustrated herein are exemplary only, and are not intended as limitations on the scope of the present invention.

What is claimed is:

1. A method of frequency converson, comprising
generating an input frequency,
establishing a time dependent signal functionally related to said input frequency,
generating a control signal functionally related to a preselected time interval and to said time dependent signal, and
generating an output frequency which is functionally related to said control signal.

2. The method described in claim 1, wherein said time dependent signal is a timing pulse defining the termination of a time interval functionally related to said input frequency.

3. The method described in claim 2, including
generating a plurality of function pulses,
counting the number of said function pulses occurring during said preselected time interval,
generating said control signal as a function of said number of function pulses and said time interval defined by said timing pulse, and
adjusting the frequency of said function pulses in response to said control signal.

4. The method described in claim 1, wherein said time dependent signal is a reference voltage having a magnitude functionally related to said input frequency.

5. The method described in claim 4, including
generating a first ramp voltage during a time interval functionally related to said input frequency, and
establishing said reference voltage as a function of said ramp voltage and said time interval which is functionally related to said input frequency.

6. The method described in claim 5, including
generating a second ramp voltage having a slope functionally related to said preselected time interval, and
deriving said output frequency as a function of said reference voltage and said slope of said second ramp voltage.

7. The method described in claim 4, including
generating a pulse train representative of said input frequency and having pulses of a preselected magnitude, and
establishing said reference voltage as a function of the frequency of said pulses in said pulse train.

8. The method described in claim 7, including
generating a ramp voltage having a slope functionally related to said preselected time interval, and
deriving said output frequency as a function of said slope in said ramp voltage and said reference voltage.

9. Frequency conversion apparatus, comprising
first generating means for generating an input frequency,
timing means for establishing a time dependent signal functionally related to said input frequency,
control means generating a control signal functionally relating to a preselected time interval and to said time dependent signal, and
second generating means generating an output frequency which is functionally related to said control signal.

10. The apparatus described in claim 9, wherein said timing means includes signal generating means for generating a timing pulse defining the termination of a time interval functionally related to said input frequency.

11. The aparatus described in claim 10, wherein said apparatus further includes
a pulse generator for generating a train of function pulses,
first counting means for generating an indicating pulse to indicate the number of function pulses generated during said preselected time interval,
voltage means for generating said control signal as a voltage functionally related to said time interval defined by said timing pulse and said number of function pulses counted during said preselected time interval, and
adjustment means for adjusting the frequency of said function pulses in response to said voltage.

12. The apparatus described in claim 11, wherein said voltage means includes
circuit means responsive to said timing pulse and said indicating pulse to generate first and second actuating pulses defining the time differential between the occurrence of said timing and indicating pulses, and
a second counting means interconnected with said circuit means and said pulse generator to count the number of function pulses occurring during the time differential defined by said actuating pulses.

13. The apparatus described in claim 12, wherein said second counting means is further adapted to derive said control signal as a voltage functionally related to the number of function pulses counted during said time differential.

14. The apparatus described in claim 13, wherein said pulse generator is a voltage controlled oscillator having a bias dependent on said voltage derived by said second counting means.

15. The apparatus described in claim 14, wherein said apparatus further includes zero offset means for applying a preselected offset voltage to said bias of said oscillator.

16. The apparatus described in claim 9, wherein said time dependent signal is a reference voltage having a magnitude functionally related to said input frequency.

17. The apparatus described in claim 16, including
a first ramp generator for generating a first ramp voltage during a time interval functionally related to said input frequency, and
a voltage source for providing said reference voltage as a function of said first ramp voltage and said time interval which is functionally related to said input frequency.

18. the apparatus described in claim 17, including
a second ramp generator for generating a second ramp voltage having a slope functionally related to said preselected time interval, and
wherein said second generating means is adapted to derive said output frequency as a function of said reference voltage and said slope of said second ramp voltage.

19. The apparatus described in claim 18, including bleed means for reducing said reference voltage in a preselected time dependent manner.

20. The apparatus described in claim 19, including zero offset means for adding a preselected offset voltage to said reference voltage.

21. The apparatus described in claim 16, wherein said first generating means generates a pulse train representative of said input frequency and having pulses of a preselected magnitude, and wherein said apparatus further includes means for establishing said reference voltage as a function of the frequency of said pulses of a preselected magnitude.

22. The apparatus in claim 21, wherein said second generating means includes
a ramp generator for generating a ramp voltage having a slope functionally related to said preselected time interval, and
means for deriving said output frequency as a function of said slope of said ramp voltage and said reference voltage.

23. The apparatus described in claim 22, including bleed means for reducing said reference voltage in a preselected time dependent manner.

24. The apparatus described in claim 23, including zero offset means for adding a preselected offset voltage to said voltage.

References Cited

UNITED STATES PATENTS

| | | | |
|---|---|---|---|
| 3,084,307 | 4/1963 | Landis | 324—79 XR |
| 3,177,442 | 4/1965 | Halverson. | |
| 3,246,231 | 4/1966 | Clarke | 321—61 XR |
| 3,353,098 | 11/1967 | Foster et al. | |
| 3,422,312 | 1/1969 | Albarda | 321—60 XR |

WILLIAM M. SHOOP, JR., Primary Examiner